US012677175B2

(12) United States Patent
Priyanto et al.

(10) Patent No.: US 12,677,175 B2
(45) Date of Patent: Jul. 7, 2026

(54) EARLY MEASUREMENT REPORT

(71) Applicant: Sony Corporation, Tokyo (JP)

(72) Inventors: Basuki Priyanto, Lund (SE); Martin Beale, Surrey (GB); Shin Horng Wong, Surrey (GB)

(73) Assignee: Sony Group Corporation, Tokyo (JP)

( * ) Notice: Subject to any disclaimer, the term of this patent is extended or adjusted under 35 U.S.C. 154(b) by 568 days.

(21) Appl. No.: 17/266,586

(22) PCT Filed: Jul. 31, 2019

(86) PCT No.: PCT/EP2019/070656
§ 371 (c)(1),
(2) Date: Feb. 6, 2021

(87) PCT Pub. No.: WO2020/030501
PCT Pub. Date: Feb. 13, 2020

(65) Prior Publication Data
US 2021/0195458 A1   Jun. 24, 2021

(30) Foreign Application Priority Data
Aug. 10, 2018   (SE) .................................... 1830239-8

(51) Int. Cl.
*H04W 24/10*        (2009.01)
*H04W 24/08*        (2009.01)
(Continued)

(52) U.S. Cl.
CPC ........... *H04W 24/10* (2013.01); *H04W 24/08* (2013.01); *H04W 74/004* (2013.01); *H04W 74/0833* (2013.01)

(58) Field of Classification Search
CPC ...................................................... H04W 24/10
See application file for complete search history.

(56) References Cited

U.S. PATENT DOCUMENTS

| | | |
|---|---|---|
| 2011/0250913 A1 | 10/2011 | Vajapeyam |
| 2015/0016312 A1 | 1/2015 | Li |

(Continued)

FOREIGN PATENT DOCUMENTS

| | | |
|---|---|---|
| CA | 3011335 A1 | 8/2017 |
| CN | 101292446 A | 10/2008 |

(Continued)

OTHER PUBLICATIONS

International Search Report and Written Opinion from corresponding International Application No. PCT/EP2019/070656, mailed on Nov. 11, 2019, 13 pages.

(Continued)

*Primary Examiner* — Jason E Mattis
(74) *Attorney, Agent, or Firm* — Tucker Ellis LLP

(57) ABSTRACT

A method of operating a wireless communication device (102) includes performing a channel measurement of a wireless link (111) between the wireless communication device (102) and a network node (101) of a communication network (90). The method also includes transmitting, as part of a random access procedure (6000) for accessing the communication network (90), an uplink message (6003) to the network node (101), the uplink message (6003) carrying a measurement report (160) of the channel measurement. The method also includes providing, to the network node (101), an indication (190) related to whether the uplink message (6003) carries the measurement report (160).

20 Claims, 8 Drawing Sheets

(51) Int. Cl.
   *H04W 74/00*     (2009.01)
   *H04W 74/0833*   (2024.01)

(56) References Cited

U.S. PATENT DOCUMENTS

| | | | |
|---|---|---|---|
| 2019/0215119 | A1 | 7/2019 | Kim et al. |
| 2019/0215872 | A1* | 7/2019 | Park ................. H04W 52/0216 |
| 2019/0305830 | A1* | 10/2019 | Zhou .................... H04B 7/0697 |
| 2019/0387548 | A1 | 12/2019 | Kim |
| 2020/0178107 | A1* | 6/2020 | Miao ..................... H04W 24/08 |
| 2020/0383119 | A1* | 12/2020 | Sun ...................... H04L 5/0053 |
| 2021/0219166 | A1* | 7/2021 | Morozov ................ H04W 8/24 |
| 2023/0199617 | A1* | 6/2023 | Höglund .............. H04W 72/23 |
| | | | 370/329 |

FOREIGN PATENT DOCUMENTS

| | | |
|---|---|---|
| CN | 102939777 A | 2/2013 |
| CN | 104662946 A | 5/2015 |
| CN | 107926056 A | 4/2018 |
| JP | 2010507978 A | 3/2010 |
| JP | 2011508512 A | 3/2011 |
| JP | 2013528990 A | 7/2013 |
| JP | 2016528791 A | 9/2016 |
| WO | WO-2017114474 A1 | 7/2017 |
| WO | 2017130989 A1 | 8/2017 |
| WO | WO-2018030756 A1 | 2/2018 |
| WO | WO-2018097497 A1 | 5/2018 |

OTHER PUBLICATIONS

Office Action and Search Report from corresponding Swedish Application No. 1830239-8, mailed on Mar. 20, 2019, 7 pages.

Qualcomm Incorporated, "Fast SCell Configuration through Quick SCell Measurement Reporting", 3GPP TSG-RAN2 Meeting #101, R2-1802073, Feb. 26-Mar. 2, 2018, 8 pages.

Samsung, "Data Transfer in Inactive State Based on 4-step RACH Procedures", 3GPP TSG-RAN WG2 #97, R2-1701529, Feb. 13-17, 2017, 8 pages.

Ericsson, "Report from REL-15 MTC Session", 3GPP TSG-RAN WG2 Meeting #100, R2-1714118, Nov. 27-Dec. 1, 2017, 14 pages.

Intel Corporation, "Early Data Transmission for feNB-IoT", 3GPP TSG RAN WG1 Meeting #91, R1-1720047, Nov. 27-Dec. 1, 2017, 4 pages.

Sony, "On Providing Quality Report in Message 3", 3GPP TSG RAN WG1 Meeting #94, R1-1808351, Aug. 20-24, 2018, 4 pages.

* cited by examiner

FIG. 5A

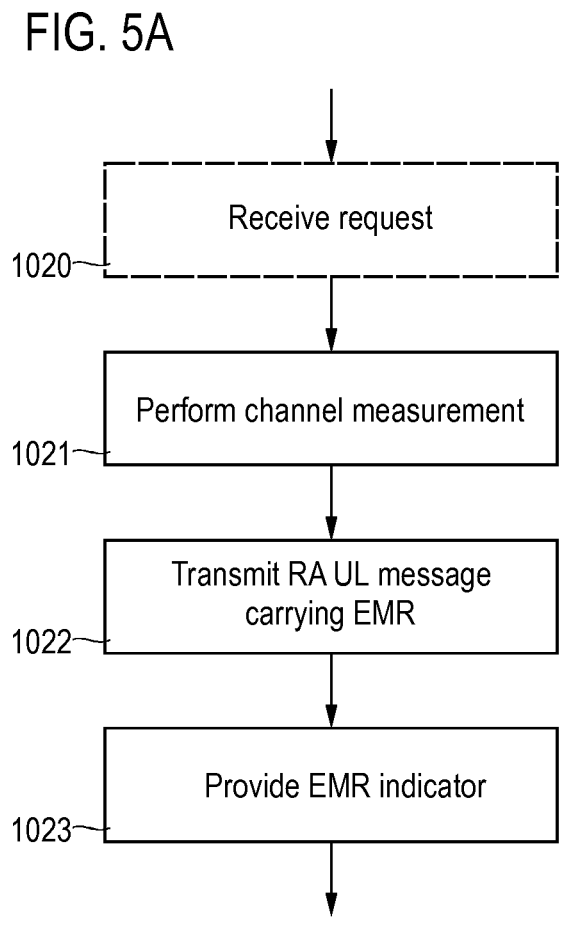

1020 — Receive request

1021 — Perform channel measurement

1022 — Transmit RA UL message carrying EMR

1023 — Provide EMR indicator

FIG. 8
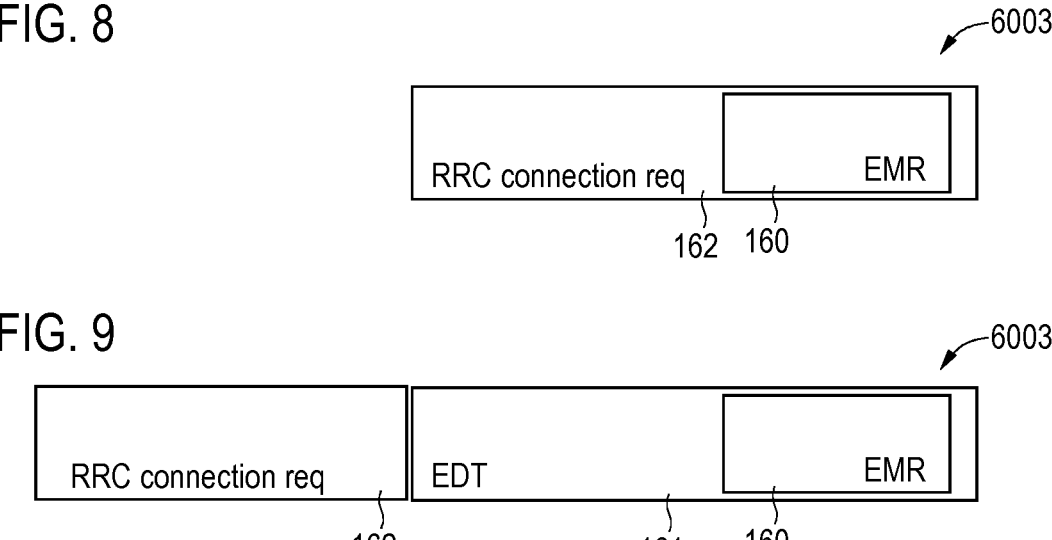
FIG. 9
FIG. 10
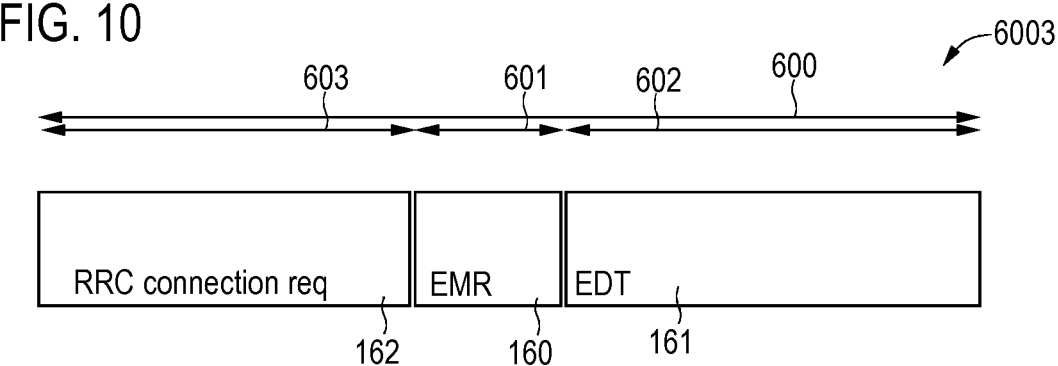

EARLY MEASUREMENT REPORT

TECHNICAL FIELD

Various examples of the invention generally relate to measurement reports. Various examples specifically relate to providing measurement reports as part of a random access procedure.

BACKGROUND

In wireless communication systems, a wireless communication device (sometimes referred to as terminal or user equipment, UE) typically measures channel quality of a respective wireless link between the UE and an access node (AN). This is referred to as performing a channel measurement. Performing the channel measurement facilitates determining parameters of wireless communication.

Typically, the UE can report on the channel measurement to the AN. This is referred to as a measurement report. The AN can set one or more parameters of the wireless communication. The AN can be implemented by a base station (BS) of a communication network.

Example parameters that can be set depending on the channel measurement include a modulation and coding scheme (MCS); and a serving BS in case of a cellular communication network including multiple BSs: hence, a handover may or may not be triggered depending on the channel measurement.

Example implementations of the measurement report include a Reference Signal Received Power (RSRP), Reference Signal Received Quality (RSRQ), and/or a Channel Quality Indication (CQI). For example, based on the measurement report, the BS may select a suitable MCS for the subsequent data transmission or—in case of a cellular communication network—the BS may decide whether the UE needs to perform a handover to another neighboring BS.

Sometimes, a UE may operate in idle mode. Here, a data connection between the UE and the AN is not maintained, but rather released. This is typically done to reduce power consumption. To transition the UE into operation in connected mode—where the data connection is established—typically various steps need to be performed. Typically, measurement reports are only transmitted by the UE once operating in connected mode.

Various techniques are based on the finding that in reference implementation—where the UE provides the measurement report in connected mode—the latency introduced by the steps required to transition operation of the UE into the connected mode can be significant.

SUMMARY

Therefore, a need exists for advanced techniques of performing and reporting on channel measurements.

This need is met by the features of the independent claims. The features of the dependent claims define embodiments.

A method of operating a wireless communication device includes performing a channel measurement of a wireless link. The wireless link is between the wireless communication device and a network node of a communication network. The method also includes transmitting, as part of a random access procedure for accessing the communication network, an uplink message to the network node. The uplink message carries a measurement report of the channel measurement. The method further includes providing, to the network node, an indication related to whether the uplink message carries the measurement report.

A computer program includes program code. The program code can be executed by a control circuitry. Executing the program code causes the control circuitry to perform a method of operating a wireless communication device which method includes performing a channel measurement of a wireless link. The wireless link is between the wireless communication device and a network node of a communication network. The method also includes transmitting, as part of a random access procedure for accessing the communication network, an uplink message to the network node. The uplink message carries a measurement report of the channel measurement. The method further includes providing, to the network node, an indication related to whether the uplink message carries the measurement report.

Also, a computer program product and a computer-readable storage medium are provided which include such program code.

A wireless communication device is configured to perform a channel measurement of a wireless link between the wireless communication device and a network node of a communication network; and to transmit, as part of a random access procedure for accessing the communication network, an uplink message to the network node, the uplink message carrying a measurement report of the channel measurement; and to provide, to the network node, an indication related to whether the uplink message carries the measurement report.

A method of operating a network node of a communication network includes receiving, as part of a random access procedure of a wireless communication device accessing the communication network, an uplink message from the wireless communication device. The uplink message carries a measurement report of a channel measurement of the wireless link performed by the wireless communication device. The method also includes obtaining, from the wireless communication device, an indication related to whether the uplink message carries the measurement report. The method also includes processing the uplink message in accordance with the indication.

A computer program includes program code. The program code can be executed by a control circuitry. Executing the program code causes the control circuitry to perform a method of operating a network node of a communication network, which method includes receiving, as part of a random access procedure of a wireless communication device accessing the communication network, an uplink message from the wireless communication device. The uplink message carries a measurement report of a channel measurement of the wireless link performed by the wireless communication device. The method also includes obtaining, from the wireless communication device, an indication related to whether the uplink message carries the measurement report. The method also includes processing the uplink message in accordance with the indication.

Also, a computer program product and a computer-readable storage medium are provided which include such program code.

A network node of a communication network is configured to receive, as part of a random access procedure of a wireless communication device accessing the communication network, an uplink message from the wireless communication device, the uplink message carrying a measurement report of a channel measurement of the wireless link performed by the wireless communication device; and to obtain, from the wireless communication device, an indication related to whether the uplink message carries the measurement report; and to process the uplink message in accordance with the indication.

A system includes a wireless communication device and a network node of a communication network. The wireless communication device is configured to perform a channel measurement of a wireless link between the wireless communication device and the network node. The wireless communication device is further configured to transmit, as part of a random access procedure for accessing the communication network, an uplink message to the network node, the uplink message carrying a measurement report of the channel measurement. The wireless communication device is further configured to provide, to the network node, an indication related to whether the uplink message carries the measurement report. The network node is configured to receive the uplink message and to obtain the indication and to process the uplink message in accordance with the indication.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 5A is a flowchart of a method according to various examples.

FIG. 8 schematically illustrates a message according to various examples.

FIG. 9 schematically illustrates a method according to various examples.

FIG. 10 schematically illustrates a method according to various examples.

DETAILED DESCRIPTION OF EMBODIMENTS

Figures 1, 2:
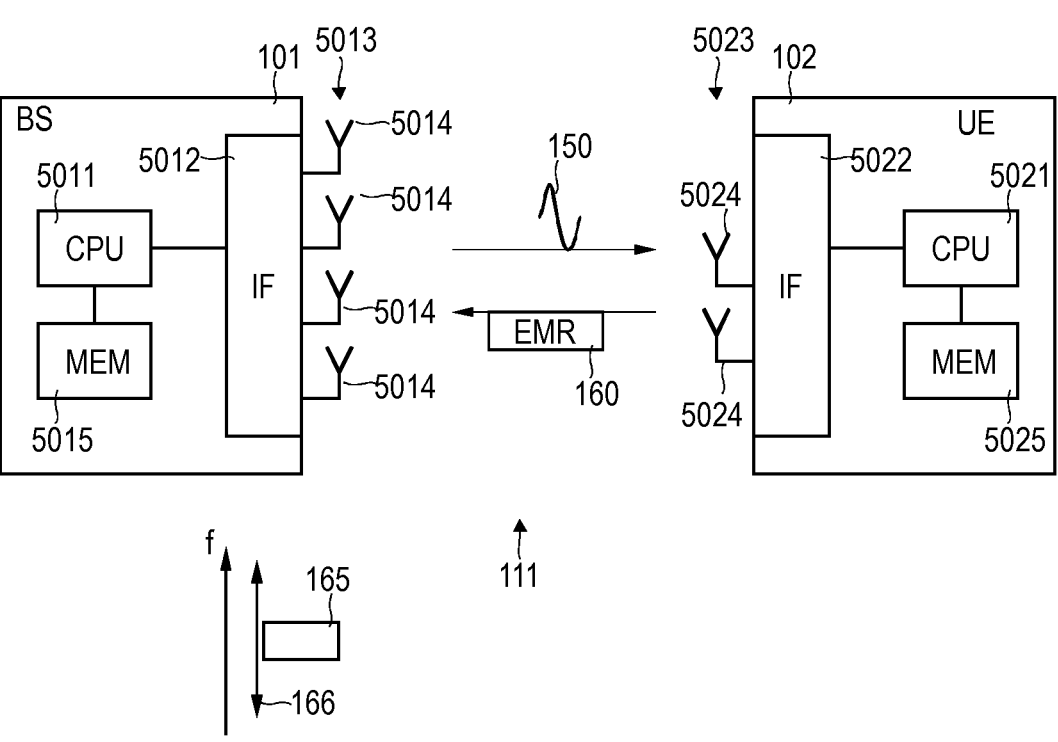
FIG. 1 schematically illustrates a communication system according to various examples.
FIG. 2 schematically illustrates the communication system of FIG. 1 in greater detail.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Techniques are described which generally relate to communicating on a wireless link. The wireless link can be between two nodes of a wireless communication system. The wireless link may generally relate to a communication link between two nodes of a communication system using electromagnetic waves or light as a transmission medium.

As a general rule, the wireless communication system can be implemented in various manners. For example, a Wireless Local Area Network (WLAN) communication system or a Bluetooth communication system or a peer-to-peer wireless communication system may be implemented. It would also be possible to implement the wireless communication system by a cellular communication network to which UE:s can connect.

For sake of simplicity, hereinafter, techniques will be described in which a communication system is implemented by a cellular communication network to which UE:s are connectable. A UE may be connectable to the cellular communication network through a respective data connection. The UE may connect to the cellular communication network through multiple BSs of a radio access network (RAN) of the cellular communication network. Example implementations include a Third Generation Partnership Project (3GPP) Long Term Evolution (LTE) cellular communication network. However, similar techniques may be readily applied to different kinds and type of cellular communication networks, e.g., the upcoming 3GPP New Radio (NR) cellular communication network or Internet of Things (IOT) communication networks, e.g., based on Narrowband (NB)-IOT or Machine Type Communication (MTC).

Hereinafter, generally techniques with respect to performing and/or configuring channel measurements of the wireless link are described. Specifically, techniques will be described that relate to performing and/or configuring channel measurements at the UE.

Channel measurements may generally provide an indication of a quality of communication on the wireless link. For example, channel measurements may allow to derive an error rate, a reliability, a fading profile, and/or a path loss, etc. of data or signals communicated via the wireless link.

As a general rule, the channel measurements can be implemented in various manners. For example, downlink reference signals (sometimes also referred to as pilot signals) may be transmitted by a BS and may be received by the UE. Then, a receive property—e.g., amplitude and/or phase—of the downlink reference signal can be measured to perform the channel measurement.

Further, hereinafter, techniques with respect to reporting on channel measurements are described. A respective measurement report may be implemented by one or more indicators that are indicative of a result of the channel measurement. Different kinds and types of measurement reports may be used, e.g., an RSRP, an RSRQ or a CQI. For example, Layer 1 measurement reports defined on a Physical layer of a transmission protocol stack could be used. It would also be possible to use Layer 2 or Layer 3 measurement reports.

According to various examples, a UE can provide the measurement report to the communication network before a data connection has been fully established between the UE and the communication network. The measurement report may be transmitted during a random access (RA) procedure for connecting the UE to the communication network. This is referred to as early measurement report (EMR), herein-after.

An uplink (UL) message of the RA procedure may carry the EMR. For example, a 4-step RA procedure may be used. Here, the channel measurement report may be carried by the third of four messages (Msg.3) of the 4-step RA procedure (including Msg.1—i.e., the RA preamble—, Msg.2—includ-ing an UL grant for Msg.3, Msg. 3, and Msg.4).

In other words, it would be possible to implement the EMR at a point in time at which the UE is not (yet) operating in a connected mode. For example, it would be possible to implement the EMR while implementing a transition of operation of the UE in idle mode to operation of the UE in connected mode. This transition is associated with setting up the data connection. This transition can include Layer 3 Radio Resource Control (RRC) control signaling. The data connection and/or the connected mode operation is typically defined on Layer 3 of the transmission protocol stack associated with communication on the wireless link. The data connection may define one or more logical channels for payload and/or higher-layer control data.

Generally, in the various examples described herein EMR may help to improve DL transmission efficiency and reduce UE power consumption.

According to some examples, the EMR may be transmit-ted together with an early data transmission (EDT) in Msg.3 of the RA procedure. EDT facilitates transmission of pay-load data and/or Layer 3 RRC control data prior to com-pleting set-up of the data connection. Details with respect to EDT are described in 3GPP TSG-RAN WG1 Meeting #93, R1-1807971, Busan, Korea, 21-25 May, 2018, sections 1.5 and 2.5.

According to various examples, it is possible to selec-tively activate the EMR. For example, the EMR may be activated for a first set of UE:s and may be deactivated for a second set of UE:s. Thereby, backwards compatibility can be provided for. For example, older UE:s may not activate the EMR. From a BS perspective, the BS may receive EMRs from the first set of UE:s, but may not receive EMRs from the second set of UE:s.

Selective activation of the EMR may not only be available across different UE:s. In some scenarios, it would be pos-sible to selectively activate the EMR for a given UE. In other words, the UL message transmitted by the given UE may or may not carry the EMR, depending on a trigger criterion. Thereby, it is possible to avoid unnecessary control signaling overhead on the wireless link, by transmitting the EMR on demand. For example, typically, the given UE performs multiple RA procedures over the course of time. Then, it would be possible to sometimes activate the EMR and sometimes deactivate the EMR, depending on the particular instance of the RA procedure and taking into account the trigger criterion. As a general rule, various trigger criteria for activating or deactivating the EMR at the given UE are conceivable. Example trigger criteria include a request for the EMR received from the communication network (EMR request); and a result of the channel measurement fulfilling or not fulfilling one or more predefined criteria. An example criteria may include the RSRP falling below a certain predefined threshold, or the like.

Above, examples have been provided which pertained to selectively activating or deactivating the EMR. Various scenarios described herein are based on the finding that such selective activation or deactivation of the EMR may require awareness at the BS: if the BS receives an UL message from a given UE as part of a RA procedure of the given UE for connecting to the communication network, this awareness may help the BS to correctly interpret the information carried by the UL message. According to various examples, this awareness can be facilitated by an EMR indication.

According to various examples, the EMR indication is provided by the UE and obtained by the BS, the EMR indication pertaining to whether the EMR is activated or deactivated. In other words, the EMR indication relates to whether an UL message of one or more associated RA procedures carries or does not carry the EMR.

For example, an exemplary Boolean-type implementation of the EMR indication would be conceivable where "TRUE" indicates that the UL message carries the EMR and "FALSE" indicates that the UL message does not carry the EMR. As a general rule, less explicit options are available for implementing the EMR indication.

By means of the EMR indication the BS can determine whether a certain UL message—e.g. received from one (a-priori unknown) of a plurality of UEs or received from a UE that can selectively transmit the EMR—carries the EMR or does not carry the EMR. Thus, the BS may determine, based on the EMR indication, whether a given one of a plurality of UL messages carries or does not carry the EMR. The EMR indication is suited for enabling such a determi-nation by the BS.

Hence, by means of the EMR indication, it is possible to flexibly support selective activation of the EMR, e.g., across multiple UE:s or across multiple RA procedures of a given UE. By means of the EMR indication, the BS can correctly interpret the information content of the UL message. For example, the BS can distinguish between different informa-tion included in the UL message. For example, the BS can distinguish between a RRC connection request and the EMR, both being carried by the UL message; it would also be possible to distinguish between the EMR and an EDT, both being carried by the UL message. It is possible to receive messages from UEs supporting EMR and UEs not supporting EMR.

As a general rule, the EMR indication can be imple-mented in various manners. For example, the EMR indica-tion can be provided explicitly or implicitly. An example of an explicit indication would be that the UE provides some dedicated information that can be directly used by the BS to derive whether the UL message carries or does not carry the EMR, e.g., the above-identified Boolean-type implementa-tion. In an implicit implementation, the BS may require some processing, possibly based on additional information, to derive whether the UL message carries or does not carry the EMR.

As a further general rule, the EMR indication can be prospectively provided, i.e., ahead of the EMR; or can be provided along with the EMR. This is explained in further detail below.

(i) The EMR indication can be prospectively provided. For example, a RRC control message may be communicated while the UE operates in connected mode, i.e., prior to commencing the RA procedure. The RRC control message may prospectively (and explicitly) indicate whether the EMR will or will not be activated for the next one or more RA procedure performed by the UE.

As will be appreciated, in such a scenario of prospective EMR indication, the EMR indication is not provided in a strict timing relationship with the EMR. For example, if the EMR indication is provided while the UE is being operated in connected mode and before operation of the UE is transitioned into idle mode, the time duration between the EMR indication and the actual EMR may not be well-defined.

In other examples, the prospective EMR indication may be provided in a well-defined temporal relationship ahead of the associated EMR. For example, it would be possible that the EMR indication is provided during the RA procedure that also includes the EMR. For example, it would be possible that the EMR indication is provided by selection of a RA preamble of the RA procedure from a subset of all available RA preambles, the subset being associated with selective activation of the EMR. Alternatively or additionally, the EMR indication could be provided by selection of time-frequency resources for transmission of RA preambles. Such techniques are generally referred to as physical RA channel (PRACH) partitioning.

(ii) In other examples, it would be possible that the EMR indication is provided as part of the UL message that also carries or does not carries the EMR. For example, it would be possible that the UL message includes a respective indicator in a header thereof. In another example, an implicit EMR indication may be provided by appropriately structuring a transport block (TB) associated with the UL message. In other words, the structure of a TB that is associated with the UL message may be implemented depending on whether the UL message includes or does not include the EMR. Then, the structure of the TB functions as the EMR indication. For example, different sizes of TBs may be selected depending on whether the UL message carries or does not carry the EMR. Alternatively or additionally, a partitioning of the transport block may be selected depending on whether the UL message carries or does not carry the EMR. For example, the partitioning of the TB can relate to a sequence of information elements of the UL message. Then, the BS—e.g., by performing blind decoding—on the logical channel on which the UL message is received, may be able to test various assumptions for the TB structure and test whether a meaningful result is obtained in the decoding, e.g., based on checksum, etc..

Further, the EMR indication can be generally combined with an EMR request. By means of the EMR request, the network may be able to selectively activate transmission of the EMR. For example, the EMR indication could be prospectively provided by the UE, e.g., by PRACH partitioning or by the above-described RRC control message. Then, the BS may transmit an EMR request, based on the reception of the EMR indication. If the UE receives the EMR request, it will transmit the UL message carrying EMR. On the other hand, if the UE provides the EMR indication, but the BS decides to not transmit the EMR request, the UE may not transmit the EMR. The EMR indication in combination with the EMR request can thus trigger the EMR to be carried by the UL message; in this sense, the EMR indication is implicit, because the EMR indication in combination with the EMR request decides whether the UL message carries or does not carry the EMR. The EMR indication may hence be indicative of the capability of the UE to activate the EMR. Nonetheless, still, the BS—transmitting the EMR request and obtaining the EMR indication—has full awareness of whether the UL message carries or does not carry the EMR.

As will be appreciated from the above, various options are generally available for implementing the EMR indication. Such options can be combined with each other to form further options.

FIG. 1 schematically illustrates a wireless communication system 100 that may benefit from the techniques disclosed herein.

The wireless communication system 100 includes an AN 101 and a UE 102. A wireless link 111 is established between the AN 101 and the UE 102. The wireless link 111 includes a DL link from the AN 101 to the UE 102; and further includes an UL link from the UE 102 to the AN 101.

The UE 102 may be one of the following: a smartphone; a cellular phone; a table; a notebook; a computer; a smart TV; an MTC device; an eMTC device; an IoT device; an NB-IoT device; a sensor; an actuator; etc.

The AN 101 can be part of a communication network, e.g., a Local Area Network (LAN) or a cellular communication network; in latter case, the AN 101 is referred to BS.

Hereinafter, the techniques are described for illustrative purposes with respect to an implementation of the AN 101 by a BS.

FIG. 2 schematically illustrates the BS 101 and the UE 102 in greater detail. The BS 101 includes a processor 5011 and an interface 5012, sometimes also referred to as frontend. The interface 5012 is coupled via antenna ports (not shown in FIG. 2) with an antenna array 5013 including a plurality of antennas 5014. Generally, the antenna array is optional. Each antenna 5014 may include one or more LC-oscillators implemented by the electrical traces. The BS 101 further includes a memory 5015, e.g., a non-volatile memory. The memory may store program code that can be executed by the processor 5011. Executing the program code may cause the processor 5011 to perform techniques with respect to: participating in a RA procedure with the UE 102; obtaining an EMR indication; participating in an EDT; receiving a message potentially carrying an EMR; decoding and specifically blind decoding of an UL message of the RA procedure potentially carrying the EMR; etc.

The UE 102 includes a processor 5021 and an interface 5022, sometimes also referred to as frontend. The interface 5022 is coupled via antenna ports (not shown in FIG. 2) with an antenna array 5023 including a plurality of antennas 5024. The antenna array is optional. The UE 102 may include a single antenna 5024. Each antenna 5024 may include one or more electrical traces to carry a radio frequency current. Each antenna 5024 may include one or more LC-oscillators implemented by the electrical traces. The UE 102 further includes a memory 5025, e.g., a non-volatile memory. The memory 5025 may store program code that can be executed by the processor 5021. Executing the program code may cause the processor 5021 to perform techniques with respect to participating in a RA procedure with the BS 101; providing an EMR indication; participating in an EDT; transmitting a message carrying an EMR; etc.

The BS 101 and the UE 102 can communicate on the wireless link 111 across a certain channel bandwidth 166. For example, an Orthogonal Frequency Division Multiplex (OFDM) modulation may be employed where a carrier includes multiple subcarriers that span the channel bandwidth 166.

In FIG. 2, there is also illustrated a narrowband 165 that only occupies a sub-fraction of the entire channel bandwidth 166. Sometimes, the narrowband 165 can be implemented by one or more sub-carriers of an OFDM carrier. In other examples, the narrowband can also be implemented by a separate carrier, e.g., not operating according to OFDM.

In the scenario FIG. 2, a downlink (DL) reference signal 150 is transmitted by the BS 101 and received by the UE 102. The DL reference signal 150 may have a well-defined signal shape. Based on the DL reference signal 150, the UE 102 can perform a channel measurement. The channel measurement may yield a quality of communicating on the wireless link 111, e.g., in DL direction and/or in UL direction. Reciprocity of the channel of the wireless link 111 may be assumed. Based on the channel measurement, an EMR 160 is transmitted by the UE 102 and received by the BS 101.

As a general rule, various options are available for performing the channel measurement. For example, based on a comparison of the receive amplitude and a transmit amplitude of the DL reference signal 150, a path loss of the channel of the wireless link 111 can be estimated. The RSRP may be determined based on the receive amplitude of the DL reference signal 150. Furthermore, the RSRQ may be determined. Also, a channel state indication (CSI) such as a CQI can be determined. The EMR 160 may be indicative of or include the RSRP, RSRQ or the CQI. This may correspond to Layer 1 channel measurements. Further, while measuring receive amplitude and/or receive phase of the DL reference signal 150 can correspond to a low-level channel measurement (e.g., Layer 1 channel measurements), in other examples, other kinds and types of channel measurements may be implemented. For example, a decoding quality of one or more repetitions of a DL message may be taken into consideration. Again, various implementations for the decoding quality are conceivable. Some common decoding algorithms provide a reliability measure of the decoding. For example, this reliability measure may be used to determine the decoding quality. In another example, early decoding attempts may be implemented. Such a scenario is particular applicable to a Coverage Enhancement (CE) policy. Here, multiple repetitions of a message are transmitted and combined at the receiver, before decoding. The count of the multiple repetitions is defined by a CE repetition count. For example, the time-domain baseband waveforms of a number of repetitions of a DL message may be combined, to thereby yield a higher signal to noise ratio. Then, the combined waveforms may be decoded. In this regard, early decoding attempts may refer to premature decoding, before the reception of the number of repetitions has been completed. Sometimes, due to a good channel quality, it is possible to successfully decode data included in a message using an early decoding attempt. Generally, the result of the early decoding attempt can be used to perform the channel measurement. In a CE scenario, the EMR 160 can then correspond to a CE repetition level indicator, i.e., can be indicative of whether the CE repetition count should be decreased or increased or whether the CE repetition count should be set to an appropriate value.

As a general rule, the channel measurements may be performed across the entire channel bandwidth 166 or may be restricted to the narrowband 165. For example, the reference signals 150 may be transmitted on the narrowband 165. Then the channel measurements can be performed for the narrowband 165 based on a receive property of the reference signals 150. It would also be possible that a DL message of the RA procedure—e.g., Msg.2—is transmitted on the narrowband 165. Then, for example if the channel measurements are based on received reference signal located on the narrowband 165, it is possible that the channel measurements are performed for the narrowband 165. As a general rule, the narrowband 165 that is used for performing the channel measurements may be defined by the BS 101 or, generally, the communication network.

Figure 3:
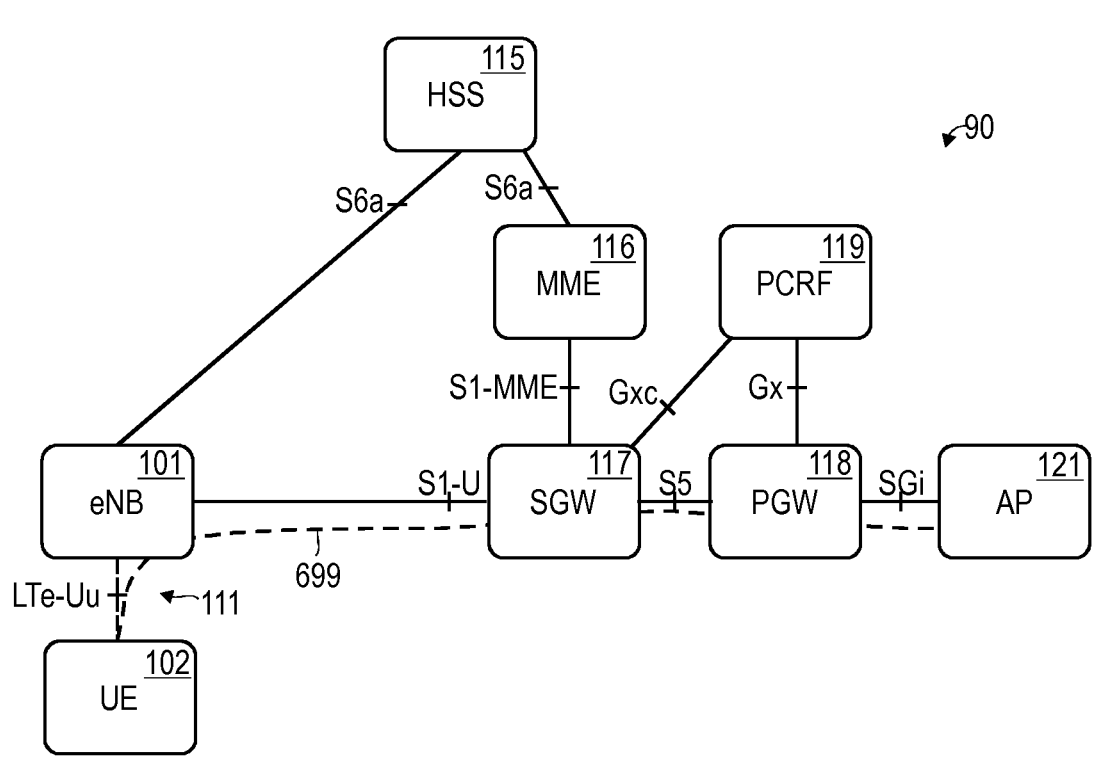
FIG. 3 schematically illustrates a communication network that can implement the communication system according to various examples.

FIG. 3 illustrates aspects with respect to the architecture of a cellular communication network 90 according to some examples implementations. In particular, the cellular communication network 90 according to the example of FIG. 3 implements the 3GPP LTE architecture, sometimes referred to as evolved packet system (EPS). The BS 101 and the UE 102 implement the evolved UMTS terrestrial radio access technology (E-UTRAN); therefore, the BS 101 is labeled evolved node B (eNB) in FIG. 3.

The UE 102 is registered to the cellular communication network 90. In the example of FIG. 3, the UE 102 is connected to the cellular communication network 90 via the wireless link 111 to a BS 101 of the cellular communication network 90. A data connection 699 is established. Thus, the UE 102 operates in connected mode. In other examples, the UE 102 may be registered to the cellular communication network 90, but no active data connection 699 may be maintained. Then, the UE 102 operates in idle mode. To set-up the data connection 699, a RA procedure may be performed by the UE 102 and the BS 101. The RA procedure thus transitions the UE 102 from operation in idle mode to operation in connected mode. The data connection 699 may be implemented by one or more bearers which are used to communicate service-specific data. The data connection 699 may be, at least partly, defined on a Layer 2 or Layer 3 of a transmission protocol stack implemented by the BS 101 and the UE 102 for communicating on the wireless link 111. For example, in connection with the 3GPP LTE E-UTRAN, the data connection 699 may be implemented on the RRC layer.

The BS 101 is connected with a gateway node implemented by a serving Gateway (SGW) 117. The SGW 117 may route and forward payload data and may act as a mobility anchor during handovers of the UE 102. The SGW 117 is connected with a gateway node implemented by a packet data network Gateway (PGW) 118. The PGW 118 serves as a point of exit and point of entry of the cellular network 90 for data towards a packet data network (PDN; not shown in FIG. 3): for this purpose, the PGW 118 is connected with an access point node 121 of the packet data network. The access point node 121 is uniquely identified by an access point name (APN). The APN is used by the UE 102 to seek access to the packet data network. The PGW 118 can be an endpoint of the data connection 699 for packetized payload data of the UE 102.

A control layer of the core network includes a mobility management entity (MME) 116. The MME 116 handles mobility and security tasks such as paging and access credentials. The MME 116 also keeps track of the operational mode of the UE 102, e.g., whether the UE 102 operates in connected or disconnected mode. The MME 116 is the termination point of the non-access stratum (NAS) connection, i.e., a control connection implemented on the layer above the RRC layer. A home subscriber server (HSS) 115 includes a repository that contains user- and subscriber-related information such as authentication and subscription information. In A Policy and Charging Rules Function (PCRF) implements policy control to thereby facilitate a certain QoS.

Figure 4:
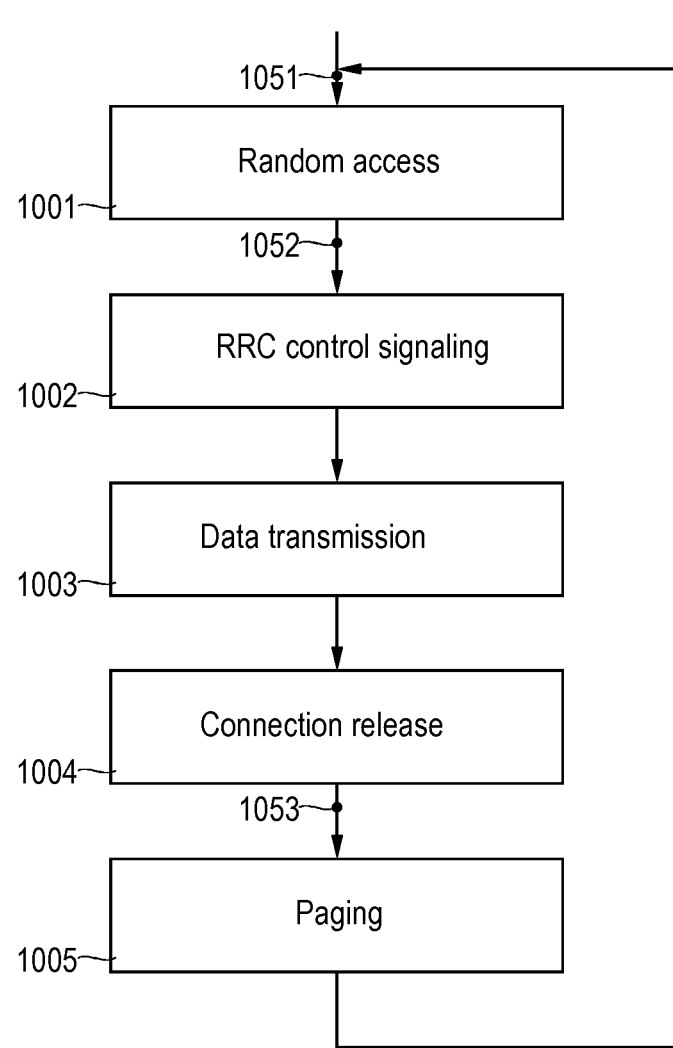
FIG. 4 schematically illustrates operation of a UE according to various examples.

FIG. 4 illustrates aspects with respect to the operation of the UE 102. For example, the method of FIG. 4 may be performed by the processor 5021.

Initially, at 1051, the UE 102 operates in idle mode. Then, at block 1001, a RA procedure is performed. For example, a 4-step RA procedure may be performed. As part of the RA procedure, the data connection 699 can be established. For this, the UE 102 can transmit a RRC connection request.

Then, at 1052, the UE has transitioned into the connected mode. The data connection 699 is established.

At block 1002, RRC control signaling can be implemented using the data connection 699. This corresponds to Layer 3 control signaling. For example, UL Layer 3 control data and/or DL Layer 3 control data may be communicated. RRC control data can be communicated.

At block 1003, payload data—e.g., application layer data—can be communicated along the data connection 699. For example, UL payload data and/or DL payload data may be communicated At block 1004, the data connection 699 is released. For example, an inactivity timer may expire since no payload data is queued for transmission.

Thus, at 1053, the UE 102 is again operated in idle mode. For example, during idle mode, the UE 102 may implement a discontinuous reception cycle.

At block 1005, the UE 102 is paged. For example, a paging indicator can be transmitted by the BS 101. The paging triggers the RA procedure at block 1001; a new iteration of the process flow according to FIG. 4 commences. As a general rule, there are other criteria conceivable for triggering the RA procedure, e.g., UL data queued for transmission at the UE 102.

FIG. 5A illustrates aspects with respect to the operation of a wireless communication device, e.g., the UE 102. For example, the method of FIG. 5A may be performed by the processor 5021. FIG. 5A illustrates a method according to various examples.

At optional block 1020, an EMR request is received, e.g., from a BS of a cellular communication network or, generally, from an AN. The EMR request triggers the following blocks 1021-1023.

As a general rule, the EMR request may be received prior to commencing a RA procedure. For example, the EMR request may be received as RRC control signaling at block 1002 (cf. FIG. 4), i.e., before transitioning to idle mode. Alternatively, it would also be possible that the EMR request is received in a DL message of the RA procedure, i.e., as part of block 1001 (cf. FIG. 4). For example, the EMR request may be carried by the RA Msg.2. It would also be possible that the EMR request is included in a paging indicator or paging message of the paging (cf. FIG. 4: block 1005). For example, the paging message may be communicated on the Physical Downlink Shared Channel (PDSCH) on resources indicated by the paging indicator.

At block 1021, a channel measurement is performed. For example, a receive property of a DL reference signal may be determined. For example, a power level measurement may be determined.

For example, the channel measurement may be performed in response to receiving the EMR request at block 1020. For example, it would be possible that the channel measurement at block 1021 is performed while the UE 102 is in idle mode, e.g., at 1053 (cf. FIG. 4). Alternatively, it would also be possible that the channel measurement is performed during the RA procedure, i.e., in between 1051 and 1052 (cf. FIG. 4).

At block 1022, an UL message is transmitted during a RA procedure, the UL message carrying the EMR that is indicative of a result of the channel measurement performed at block 1021. In other words, the UL message can be transmitted as part of block 1001 (cf. FIG. 4).

At block 1023, an EMR indication is provided. The EMR indication is related to the EMR. In the example of FIG. 5A, the EMR indication signals that the UL message carries the EMR. As already explained above, the EMR indication can take various forms, e.g., an implicit implementation and an explicit implementation are conceivable. For example, the EMR indication could be indicative of whether the wireless communication device is generally capable of transmitting the UL message carrying the EMR; such a scenario may be combined with the EMR request of block 1020.

Generally, block 1023 may be performed in parallel to block 1022, i.e., the UL message itself may be indicative of it carrying the EMR. It would also be possible that block 1022 is performed prior to block 1023, e.g., using RRC control signaling at block 1002 (cf. FIG. 4). Also, the EMR request of block 1020 may be received after providing the EMR indicator at block 1023—such a scenario is illustrated in FIG. 5B.

Figure 5B:
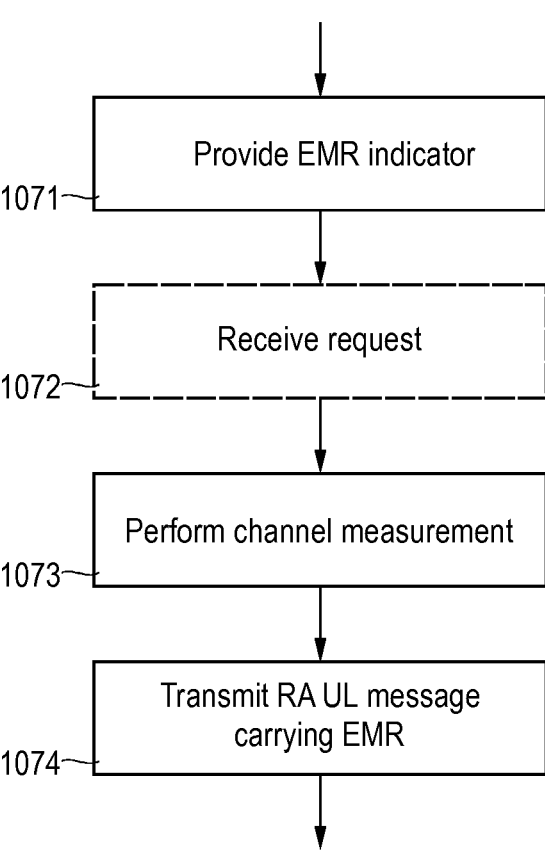
FIG. 5B is a flowchart of a method according to various examples.

FIG. 5B illustrates aspects with respect to the operation of a wireless communication device, e.g., the UE 102. For example, the method of FIG. 5B may be performed by the processor 5021. FIG. 5B illustrates a method according to various examples.

The example of FIG. 5B generally corresponds to the example of FIG. 5A. In the example of FIG. 5B, at block 1071, the EMR indication is provided. The EMR indication provided at block 1071 is related to the EMR. In the example of FIG. 5B, the EMR indication is indicative of a capability of the wireless communication device to transmit the UL message carrying the EMR (wireless communication devices that do not have this capability do not provide the EMR indication). For example, PRACH partitioning may be used to provide the EMR indication at block 1071. This helps to avoid ambiguities between different wireless communication devices attempting to connect to the network.

At block 1072, the wireless communication device receives the EMR request. This is optional. Sometimes, the wireless communication device may not receive the EMR request, e.g., because the network decides that the EMR is not required.

If, at block 1072, the EMR request is received, the wireless communication device performs the channel measurement at block 1073 and transmits the RA UL message carrying the EMR at block 1074 If the EMR request is not received then the RA UL message can be transmitted without the EMR. It may be dispensable to perform the channel measurement at block 1073. As such, receipt of the EMR request is a trigger criterion for performing the channel measurement at block 1073 and transmitting the RA UL message carrying the EMR at block 1074.

Figure 6A:
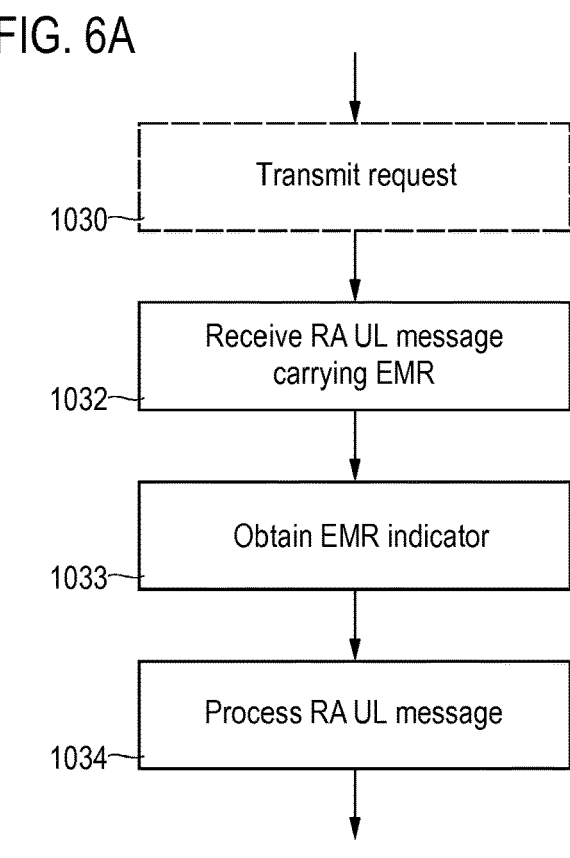
FIG. 6A is a flowchart of a method according to various examples.

FIG. 6A illustrates aspects with respect to the operation of an AN, e.g., a node of a communication network. For example, the method of FIG. 6A may be implemented by the BS 101. FIG. 6A illustrates a method according to various examples. For example, the method of FIG. 6A could be implemented by the processor 5011 (cf. FIG. 2).

At block 1030, an EMR request is transmitted. Block 1030 is optional. Block 1030 is inter-related to block 1020 (cf. FIG. 5A).

At block 1032, and UL message is received as part of a RA procedure of a UE attempting to connect to the communication network. The UL message carries an EMR. As such, block 1032 is inter-related to block 1022 (cf. FIG. 5A).

At block 1033, an EMR indicator is obtained. As such, block 1033 is inter-related to block 1023 (cf. FIG. 5A). For example, the EMR indication could be indicative of whether the wireless communication device is generally capable of transmitting the UL message carrying the EMR; such a scenario may be combined with the EMR request of block 1030.

At block 1034, the RA UL message received in block 1032 is processed. This may include decoding, forwarding from Layer 1 to Layer 2, etc.. The processing in block 1034 depends on the EMR indicator of block 1033. Thereby, the RA UL message may be processed differently than another RA UL message for which no EMR indicator is obtained or for which an EMR indicator is obtained that is indicative of the RA UL message not carrying the EMR.

Figure 6B:
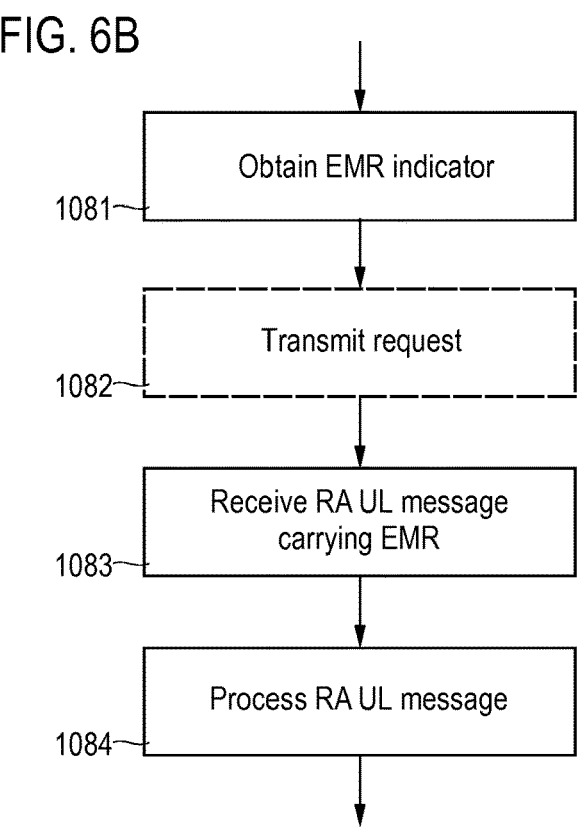
FIG. 6B is a flowchart of a method according to various examples.

FIG. 6B illustrates aspects with respect to the operation of an AN, e.g., a node of a communication network. For example, the method of FIG. 6B may be implemented by the BS 101. FIG. 6B illustrates a method according to various examples. For example, the method of FIG. 6B could be implemented by the processor 5011 (cf. FIG. 2).

FIG. 6B generally corresponds to FIG. 6A.

At block 1081, the EMR indicator is obtained from a wireless communication device. As such, block 1081 is inter-related to block 1071 (cf. FIG. 5B).

Based on the EMR indicator, the AN is aware of the capability of the respective wireless communication device to transmit the RA UL message carrying the EMR. For example, if the EMR indicator is received during the RA procedure, e.g., using PRACH partitioning, the respective BS (implementing the AN) may not be aware of the unique identity of the wireless communication device (or, more precisely, of the associated subscriber), but can nonetheless conclude that the particular wireless communication device is able to transmit the EMR. Ambiguities between multiple UE:s having and not having the capability to transmit the EMR can be avoided.

The AN can then check if it requires the EMR. For example, the AN may determine whether another measurement report is still up-to-date. Depending on this check, the AN may or may not execute block 1082, i.e., the AN may or may not transmit the EMR request at block 1082. As such, block 1082 is inter-related to block 1072 (cf. FIG. 5B).

If the AN does not obtain the EMR indicator at block 1081, it is not required to transmit the EMR request at block 1082.

Block 1083 is then inter-related to block 1074 (cf. FIG. 5B) an corresponds to block 1032 (cf. FIG. 6A).

Block 1083 corresponds to block 1034 (cf. FIG. 6A).

Figure 7:
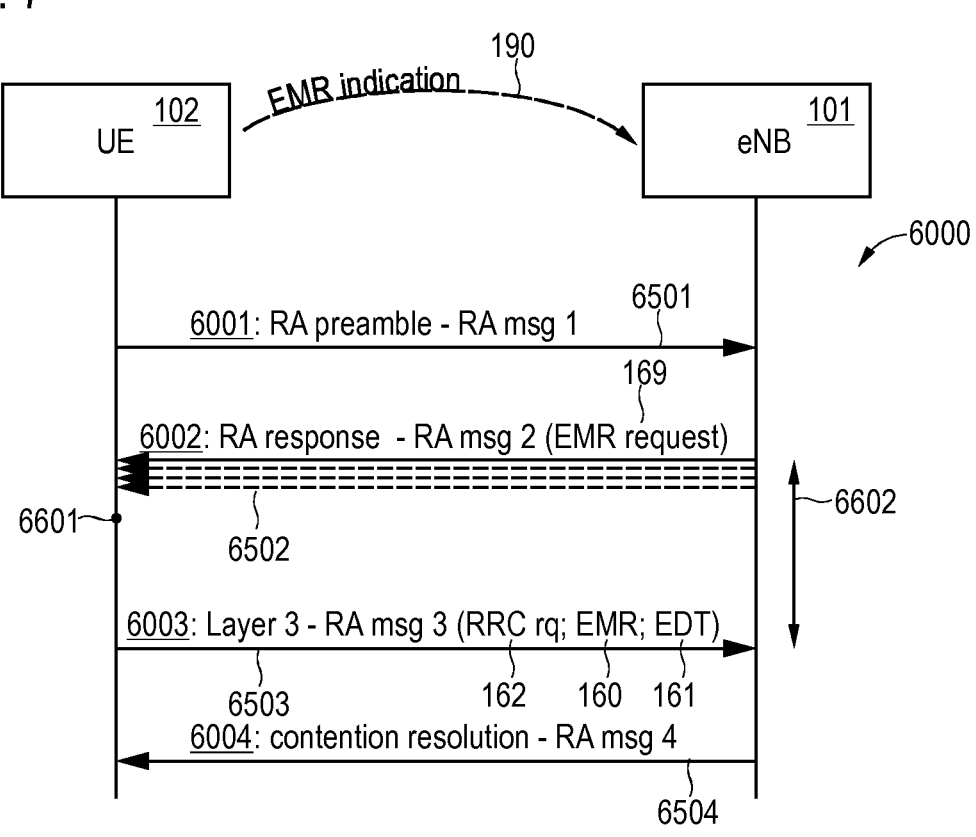
FIG. 7 is a signaling diagram of communication between a UE and a BS according to various examples, the communication pertaining to a random access procedure.

FIG. 7 schematically illustrates aspects with respect to a RA procedure 6000 (cf. FIG. 4, block 1001). FIG. 7 is a signaling diagram of communication between the UE 102 and the BS 101. FIG. 7 specifically illustrates aspects with respect to a contention-based RA procedure 6000. Also, FIG. 7 illustrates details with respect to providing the EMR 160 as part of the RA procedure 6000.

The RA procedure 6000 includes four steps, starting with a RA message 1 (Msg.1) 6001 carrying a RA preamble being transmitted from the UE 102 to the BS 101 in 6501.

The RA preamble as used herein may be a pattern or signature. The value of the RA preamble may facilitate distinguishing between different UE:s. The RA preamble may be selected from a set of preambles, e.g., 64 or 128 candidate preambles. Partitioning may be employed to convey an information content along with the RA preamble. The different preambles may use orthogonal codes. Generally, the RA preamble does not uniquely identify a UE 102. PRACH partitioning may also be employed by assigning other time-frequency resources allocated for transmission of RA preambles with a specific purpose (e.g. EDT, EMR).

According to various examples, PRACH partitioning may serve as an EMR indication 190. The EMR indication 190 may be implemented by selecting and transmitting a RA preamble in the message 6001 (Msg.1). In some examples, from this the BS 101 explicitly knows that a subsequent UL RA message Msg.3 6003 will carry the EMR 160. Also, such a scenario can be combined with an EMR request where the EMR indication is indicative of the capability of the UE 102 to transmit the RA message Msg.3 6003 carrying the EMR; the trigger criterion is then the EMR request. A reserved RA preamble can be used to indicate to the network to expect the EMR 160 in the subsequent RA message Msg.3 6003. Various techniques described herein are based on the finding that within a communication network there may be some UE:s that will be transmitting EMRs 160 (e.g., those UE:s that are semi-statically configured to do so) and some UE:s that will not (for example older UE:s, not providing for the EMR functionality, or UE:s semi-statically configured to not transmit the EMRs 160). During the RA procedure 6000, the BS 101 does not know a-priori which RA preambles are associated with UE:s that will transmit EMR 160 and those that will not. This issue is solved by the EMR indication 190. As a general rule, the EMR indication 190 can be implemented in various manners (not only using RA partitioning as explained above).

Next, at 6502, a DL RA response message 6002 (Msg.2; also referred to as RA Response message, RAR message) is transmitted by the BS 101 and received by the UE 102. The RAR message 6002 includes an UL grant for resource allocation for one or more physical resource blocks (PRBs) defined in a time-frequency grid of an OFDM carrier (cf. FIG. 2). The RAR message 6002 is addressed to the RA Radio Network Temporary Identity (RA-RNTI) of the UE 102.

In the example of FIG. 7, the RAR message 6002 also carries an EMR request 169. It is generally optional to use the EMR request 169. Also, if an EMR request 169 is used, the EMR request 169 may be implemented differently than what has been illustrated in FIG. 7. For example, the EMR request 169 may be implemented, e.g., using RRC control signaling or an information element of a paging message.

In the example of FIG. 7, the BS 101 transmits the EMR request 169 in the DL RAR message 6002. To include the EMR request 169 in the RAR message 6002, a so-called CSI Request bit in the UL grant of the RAR message 6002 that would otherwise not be used for the contention-based RA procedure 6000. The EMR request 169 could also be implemented implicitly. For example, a combination of a certain selected modulation and coding scheme (MCS) and/or TB size and/or resource allocation may be used to implement the EMR request 169. Such an example may be combined with the RA preamble partitioning into a subset for EMR-capable UE:s and a subset for other UE:s. If a UE 102 transmits a RA preamble within the subset for EMR-capable UE:s as EMR indication 190, the BS 101 knows that this UE 102 will be able to parse the RAR message 6002 that contains above-described EMR request 169. In another embodiment, the EMR request 169 can be transmitted as an extension to the UL grant carried by the RAR message 6002. In such a case, a non-EMR-capable UE 102 will read the standard UL grant and will not transmit EMR; an EMR-capable UE 102 will additionally read the extension to the UL grant.

The UE 102 then, at 6503, sends the RA message Msg.3 6003 (Msg.3). The RA message Msg.3 6003 occupies the one or more PRBs allocated by the UL grant of the RAR message 6002. Multiple information elements are included in a TB associated with the RA message Msg.3 6003 that is mapped to the one or more PRBs.

The RA message Msg.3 6003 carries a first information element, namely a RRC connection request 162 or an RRC Connection Resume that includes an ID such as S-TMSI or a Cell Radio Network Temporary Identity (C-RNTI) if available at the UE This is for setting up the data connection 699 on Layer 3 of a respective transmission protocol stack.

In the scenario of FIG. 7, the RA message Msg.3 6003 also carries a second information element, namely EDT 161. This is generally optional.

The RA message Msg.3 6003 also carries a third information element, namely the EMR 160. As a general rule, the EMR 160 may be selectively activated in some examples. Then, only some instances of the RA message Msg.3 6003 may carry the EMR 160.

As a general rule, the EMR 160 can take various formats. For example, the EMR 160 can be in form of a RSRP, a RSRQ measurement report and/or CQI measurement report. The EMR 160 implemented by the RSRP can be a value (e.g. an integer value 0, . . . 97) based on the RSRP measurement report mapping as in 3GPP TS 36.133 Table 9.1.4-1. Generally, the resources used to derive the EMR 160—i.e., the resources on which the channel measurement is performed—can be: (i) the narrowband 165 where the UE 102 monitors for the RAR message 6002; or the narrowband 165 where the UE 102 monitors a physical DL control channel (PDCCH). Generally, the narrowband 165 may be configured by the cellular communication network 90, e.g., the narrowband 165 to be measured may be indicated in the RAR message 6002.

In another example, the UE 102 can operate in a Coverage Enhanced mode where repetitions are used on the physical channels. The UE 102 can report the actual repetition level (or number of repetitions) required to receive a DL message, e.g., on a physical DL shared channel (PDSCH). One example is the number of repetitions required to receive the RAR message 6002 on PDSCH (dashed arrows in FIG. 7). For example, the CE repetition level used for transmitting the RAR message 6002 may be based on the quality of receiving the RA message 6001 (Msg.1), e.g., the number of received repetitions of the RA preamble. If the cellular communication network 90 provides more repetitions of the RAR message 6002 than required to successfully decode, the UE 102 can therefore correct this by reporting the actual repetition level it needed to receive the RAR message 6002. To test this, the UE may perform early decoding attempts prior to completing reception of all repetitions of the RAR message 6002. In detail, the UE 102 may receive the RAR message 6002 which is transmitted on PDSCH. During the reception of multiple repetitions of the RAR message 6002, the UE 102 can perform early decoding attempts. For example, if the RAR message 6002 is transmitted with 64 repetitions, the UE 102 can attempt to decode the PDSCH containing the RAR message 6002 at 16, 32, 48 and 64 repetitions. The UE 102 can then report, in the EMR 160, the actual number of repetitions that were required to decode the PDSCH. The EMR 160 may hence pertain to a number of CE repetitions.

As a general rule, various options are available for implementing the RA message Msg.3 6003 to carry the EMR 160. For example, the EMR 160 can be piggybacked to the RRC connection request 162 (cf. FIG. 8). The EMR 160 could also by piggybacked to the EDT 161, if available (cf. FIG. 9). Here, the EDT 161 bit sequence of the TB may be punctured to include the EMR 160. By including the EMR 160 as an "RRC measurement report" in EDT 161 carried by the RA message Msg.3 6003, the EMR indication 190 can be implemented implicitly. I.e., the presence of the EDT 161 can implement the EMR indication 190 (e.g., instead of using the RA preamble partitioning at message 6001. By detecting the EDT 161, the network will recognize that it has received the EMR 160. In a further example, it would be possible that the EMR 160 is transmitted along with the EDT 161 (cf. FIG. 10), i.e., the EMR 160 is attached to the EDT 161. In such a scenario, a common TBS table may be used at the UE 102 irrespective of whether the RA message Msg.3 6003 carries or does not carry the EMR 160. In such a scenario, the TB size 600 may be selected from the TB table. Then, a first fraction 601 of the TB size 600 may be allocated to the EMR 160 and a second fraction 602 of the TB size 600 may be allocated to the EDT 161; a third fraction 603 may be allocated to the RRC connection request 162. For example, assuming the size of the EMR 160 is fixed (Y bits) and the size of the RRC connection request 162 is fixed (Z bits). The actual TB size available for EDT 161—i.e., the size of the second fraction 602—would be X-Y-Z. X bits is the selected TB size 600 as taken from TB size table. It is noted that such structure of the TB can serve as an implicit implementation of the EMR indication 190: The BS 101 can blind decode the RA message Msg.3 6003 sent by the UE 102 under the hypotheses that (i) EMR 160 is carried by the RA message Msg.3 6003 in accordance with the structure; and (ii) EMR 160 is not carried by the RA message Msg.3 6003. Hence, the blind decoding can be implemented in accordance with the three TB structures of the RA message Msg.3 6003.

Also, if the cellular communication network 90 triggers the EMR 160 and the UE 102 does not have any EDT 161 to transmit, a dedicated TB size that is small enough to carry the EMR 160 can be provided by the cellular communication network 90. The dedicated TB size may be smaller than 328 bits. Hence, instead of inserting padding bits to fill up the TB, which would be inefficient, a smaller TB can be introduced to carry these EMR 160.

At this point, the BS 101 can process the EMR 160. At the BS 101, the EMR 160—e.g., implemented by the RSRP— can be used for example to determine the CE level, i.e., to support various CE levels, to apply to a data transmission that is transmitted after the EMR 160 and to decide whether to stay in the same cell or to perform hand-over. The EMR 160 can also be implemented by means of a CQI, as mentioned above. The CQI may be used by the BS 101 to determine the MCS and/or TBS of the subsequent transmissions, e.g., of the RA DL message 6004 (Msg.4).

Generally, There may be two types of CE levels: (i) RACH CE level in which we have 4 different levels, level 0, 1, 2 & 3. This will determine the repetition used on the RA preamble. And (ii) RRC CE. For RRC CE, there are two modes, i.e. CE Mode A and CE Mode B. CE Mode A basically means the normal coverage level equivalent to the coverage of regular LTE (i.e. mobile phone) coverage. CE Mode B is extended coverage e.g. for MTC devices such as utility meters that are buried in basement, which suffers from penetration loss. The RSRP may help the BS to determine which RRC CE level the UE should use.

At 6504, the BS 101 responds with a DL RA contention resolution message 6004 (Msg.4) and any potential contention between other UE:s may be resolved.

If the connection attempt of the UE 102 to the cellular communication network 90 is successful, the data connection 699 may be established. Then, wireless communication of payload UL data and/or payload DL data along the data connection 699 can commence.

Various scenarios are generally based on the finding that transmission of an EMR 160 when it is not required by the BS 101 is a waste of resources. For example, if the BS 101 is going to make scheduling decisions irrespective of the EMR 160, there is no need for the UE 102 to transmit the EMR 160. Hence, according to various examples, the RA message Msg.3 6003 selectively carries the EMR 160 depending on a trigger criterion.

Various options are available for implementing the trigger criterion. A few examples are given for the trigger criterion below.

In a first example, the trigger criterion can be a semi-static configuration by the cellular communication network 90. The trigger criterion can hence include an EMR request received from the BS 101. The BS 101 may semi-statically configure the UE 102 to provide the EMRs 160. This semi-static configuration can be performed via RRC signaling (cf. FIG. 4, block 1002). Here, the EMR request 169 is received prior to commencing the RA procedure 6000 (not illustrated in FIG. 7).

A second example trigger criterion is based on a dynamic configuration by the cellular communication network 90. For example, in the example of FIG. 6A, the EMR request 169 is included in the RAR message 6002 (cf. FIG. 7). Thereby, the cellular communication network 90 can trigger the EMR 160 on a per-RA procedure basis, i.e., at low latency.

A third example trigger criterion is based on UE measurements. The UE may measure channel conditions, e.g. RSRP, before initiating a RA procedure. The RA preamble selection may be based on the CE repetition count. In an example, the UE compares this RSRP to a threshold. If the RSRP measurement is below (worse than) the threshold, the UE is triggered to transmit the EMR. More generally, the trigger criterion may include the result of the channel measurement fulfilling a predefined criterion. This can be beneficial since it is often more important to optimize transmissions for UE:s in poor channel conditions (which use more physical resources) than UE:s in good channel conditions.

A fourth example trigger criterion includes an EMR request that is signaled to the UE in a paging message. Here the paging message contains an additional indication (e.g. in a dedicated information element) that tells the UE whether it should perform EMR or not.

As a general rule, the EMR 160 may be transmitted some shorter or longer time duration after performing the associated channel measurement. Various options are available for the timing of performing the channel measurement. Depending on the scenario, the UE 102 may perform the channel measurement prior to the RA procedure 6000—e.g., while operating in idle mode at 1053 (cf. FIG. 4)—and/or during the RA procedure 6000.

For example, performing the channel measurement prior to the RA procedure 6000 during idle mode may be suitable if the EMR 160 is triggered by the UE 102—e.g., depending on a result of the channel measurement. For example, the performing of the channel measurement during idle mode may be autonomous, i.e., up to UE implementation. In order to support EMRs 160, it would be possible that the performing of the channel measurement during idle mode is mandated by the network, i.e., using the EMR request 169.

In other examples, the UE 102 can commence performing the channel measurement in response to receiving the EMR request 169, e.g., carried by the RAR message 6002 (cf. FIG. 7). This may be during the time gap 6602 between the RAR message 6002 and the RA message Msg.3 6003. In reference implementations, the duration of the time gap 6602 is five subframes. The channel measurement can be performed N sub-frame(s) after the reception of the RAR message 6002, in which N<5. The respective point in time 6601 is indicated in FIG. 7.

For cases where performing the channel measurement requires more than 5 sub-frames, e.g. in CE mode where multiple repetitions of the RAR message 6002 are received and early decoding attempts are made, the time gap 6602 can be appropriately set. As a general rule, it would be possible to set the time gap 6602 depending on whether the RA message Msg.3 6003 carries the EMR 160, to selectively accommodate for performing the respective channel measurement. If the network has transmitted the EMR request 169, it can then expect the UE 102 to transmit the RA message Msg.3 6003 after M sub-frames where M>5 is the configured time gap 6602. In some examples, the time gap 6602 value M is fixed in the specifications and, hence, hardcoded into the UE 102. It would also be possible that the time gap 6602 is configured by the cellular communication network 90. The value M—or, generally, the time gap 6602—may be indicated in a broadcasted system information block (SIB); for example, the same SIB may carry a value for each CE repetition level to be applied for the RA procedure 6000. It would also be possible that the cellular communication network 90 configures the time gap 6602 in the RAR message 6002.

Summarizing, above techniques have been described relating to transmission of an EMR from the UE to the BS. Techniques to perform the channel measurement to determine the EMR have been described. Techniques to trigger performing of the channel measurement and/or the EMR have been described. It is has been described that an indication can be provided that the EMR is activated.

For example, a PRACH partitioning can be used to implement an EMR indication. Here, multiple scenarios are conceivable. (i) In combination with an EMR indication, the network may configure the UE using an EMR request—e.g., using DL RRC control signaling—to transmit the EMR if a trigger criterion is met, e.g., RSRP below a threshold. The UE uses the PRACH partitioning to identify itself and transmits RA Msg 3 carrying EMR. Alternatively, the EMR request may also be included by the network in a paging message. The UE can again use PRACH partitioning to identify itself as a UE that is capable of activating EMR and transmits RA Msg3 carrying the EMR. (iii) The UE can use PRACH partitioning to indicate to the network that it is capable of activating EMR. The network then decides to request for EMR in RA Msg.2. The UE then transmits Msg3 carrying EMR. Here, the use of PRACH partitioning indicates the capability of the UE to transmit the Msg3 carrying EMR, but since EMR activation depends on a further trigger criterion (here, the EMR request from the network) it doesn't mean the UE will necessarily transmits the UL message carrying EMR since it is up to network to trigger it using the EMR request in RA Msg2. If the network does not trigger the EMR, i.e., does not transmit the EMR request in RA Msg.2, then UE does not transmit EMR, i.e., transmit RA Msg.3 not carrying the EMR.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various examples have been described with respect to a cellular communication network. Similar techniques may be readily applied to other types of communication networks.

US 12,677,175 B2

19

The invention claimed is:

1. A method of operating a wireless communication device, the method comprising:
    performing a channel measurement of a wireless link between the wireless communication device and a network node of a communication network during a time gap including multiple repetitions of a downlink message of a random access procedure;
    transmitting, as part of an early data transmission (EDT) during the random access procedure for accessing the communication network, an uplink message to the network node, the uplink message carrying a measurement report of the channel measurement; and
    providing, to the network node, an indication related to whether the uplink message carries the measurement report, wherein the indication is included in a header, wherein the measurement report is a channel quality indicator (CQI) corresponding to a repetition count of the downlink message.

2. The method of claim 1, wherein the indication comprises implementing a predefined structure of a transport block associated with the uplink message.

3. The method of claim 2, wherein the transport block structure comprises at least one of a size of the transport block and a partitioning of the transport block.

4. The method of claim 1, wherein the indication comprises partitioning of a set of random access preambles or random access preamble resources of the random access procedure.

5. The method of claim 1, wherein the indication comprises Layer 3 uplink control signaling from the wireless communication device and to the communication network prior to commencing the random access procedure.

6. The method of claim 1, wherein the uplink message selectively carries the measurement report depending on a trigger criterion.

7. The method of claim 6, wherein the trigger criterion comprises a measurement request received from the communication network.

8. The method of claim 7, wherein the measurement request is received prior to commencing the random access procedure.

9. The method of claim 7, wherein the measurement request is received in a downlink message of the random access procedure, the downlink message being received by the wireless communication device prior to transmitting the uplink message.

10. The method of claim 9, wherein the channel measurement is performed in response to receiving the downlink message carrying the measurement request.

11. The method of claim 6, wherein the trigger criterion comprises a result of the channel measurement fulfilling a predefined criterion.

12. The method of claim 6, further comprising:
    depending on whether the uplink message carries the measurement report, setting a time gap between a downlink message of the random access procedure and the uplink message.

13. The method of claim 1, wherein the measurement report is punctured into the uplink data or attached to the uplink data.

14. The method of claim 1, further comprising:
    selecting, from a predefined table, a transport block size based on the uplink data, and
    allocating a fraction of the transport block to the measurement report and a further fraction of the transport block to the uplink data.

15. The method of claim 1, wherein the channel measurement is performed in a narrowband of the wireless link defined as a fraction of a channel bandwidth of the wireless link.

16. The method of claim 1, further comprising:
    receiving multiple repetitions of the downlink message of the random access procedure, and
    prior to completing said receiving of the multiple repetitions: performing an early decoding attempt, wherein the channel measurement is performed based on a result of the early decoding attempt.

17. The method of claim 1, wherein the indication is indicative of whether the wireless communication device is capable of transmitting the uplink message carrying the measurement report.

18. The method of claim 1, wherein the time gap is defined by a random access response message of the random access procedure and the uplink message.

19. A method of operating a network node of a communication network, the method comprising:
    receiving, as part of an early data transmission (EDT) during a random access procedure of a wireless communication device accessing the communication network, an uplink message from the wireless communication device, the uplink message carrying a measurement report of a channel measurement of the wireless link performed by the wireless communication device;
    obtaining, from the wireless communication device, an indication related to whether the uplink message carries the measurement report, wherein the indication is included in a header; and
    processing the uplink message in accordance with the indication,
    wherein the measurement report is channel quality indicator (CQI) corresponding to a repetition count of a downlink message in a time gap during the random access procedure.

20. A wireless communication device, comprising:
    an interface over which wireless communications with one or more network nodes are carried out; and
    a processor configured to:
        perform a channel measurement of a wireless link between the wireless communication device and a network node of a communication network during a time gap including multiple repetitions of a downlink message of a random access procedure;
        transmit, as part of an early data transmission (EDT) during the random access procedure for accessing the communication network, an uplink message to the network node, the uplink message carrying a measurement report of the channel measurement; and
        provide, to the network node, an indication related to whether the uplink message carries the measurement report, wherein the indication is included in a header, wherein the measurement report is a channel quality indicator (CQI) corresponding to a repetition count of the downlink message.

* * * * *